Sept. 13, 1949. W. H. D'ARDENNE 2,481,910
ROCKET LAUNCHER
Filed June 5, 1946 4 Sheets-Sheet 1
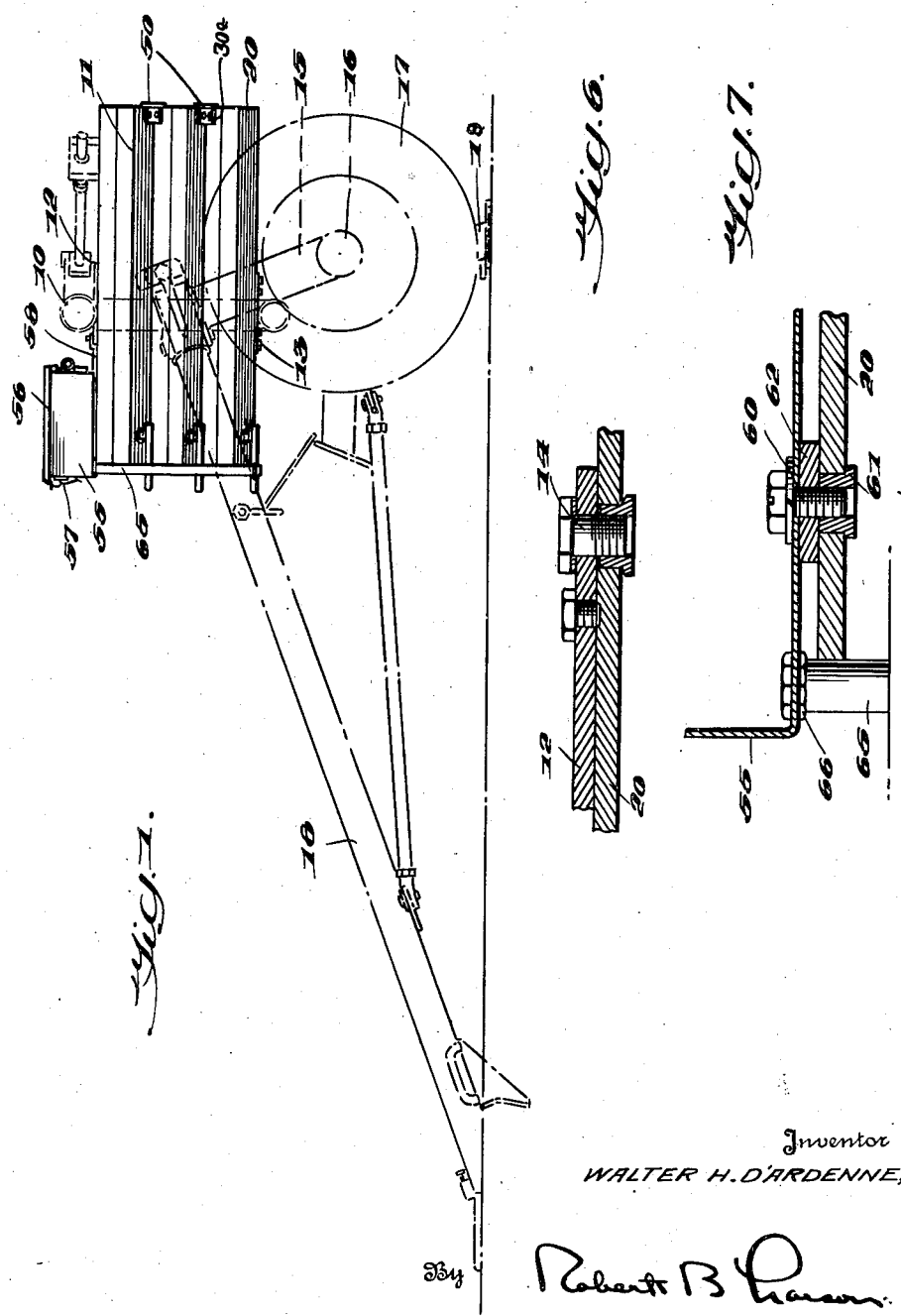
Inventor
WALTER H. D'ARDENNE,
By Robert B. Pearson
Attorney Sept. 13, 1949.　　　　W. H. D'ARDENNE　　　　2,481,910
ROCKET LAUNCHER
Filed June 5, 1946　　　　　　　　　　　　4 Sheets-Sheet 2
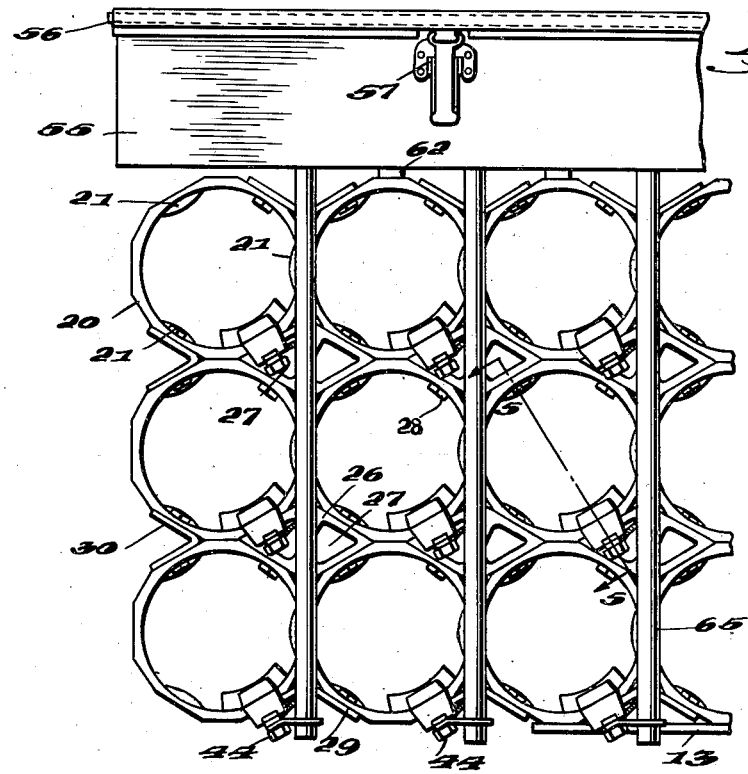
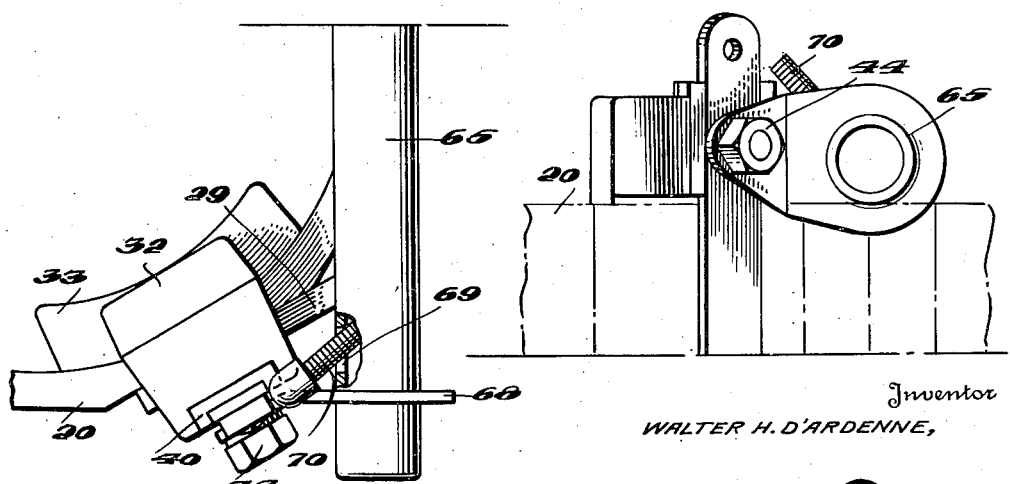
Inventor
WALTER H. D'ARDENNE,
By Robert B. Pearson
Attorney Sept. 13, 1949. W. H. D'ARDENNE 2,481,910
ROCKET LAUNCHER
Filed June 5, 1946 4 Sheets-Sheet 3
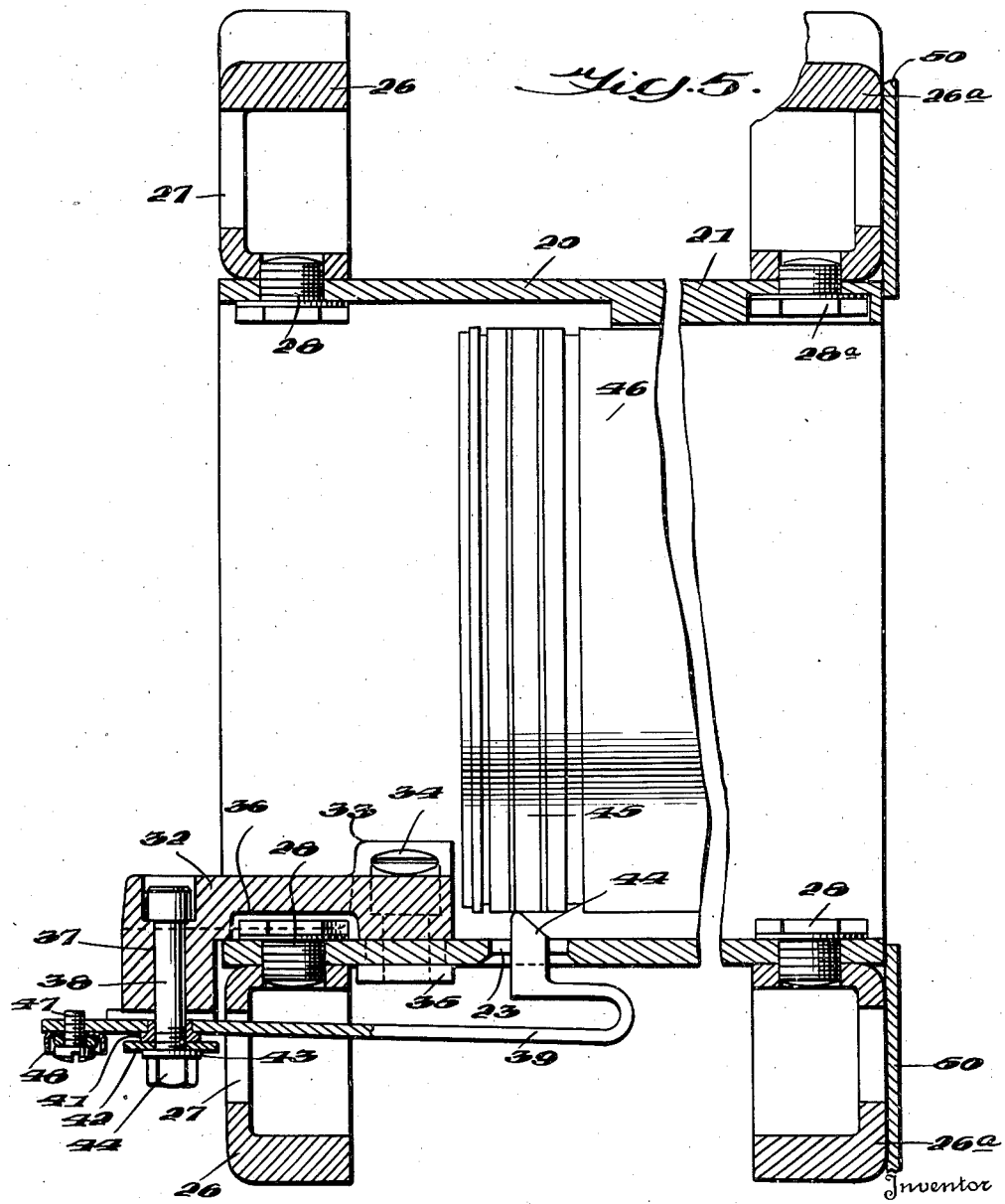
Inventor
WALTER H. D'ARDENNE,
By Robert B. Larson
Attorney Sept. 13, 1949.  W. H. D'ARDENNE  2,481,910
ROCKET LAUNCHER
Filed June 5, 1946  4 Sheets-Sheet 4
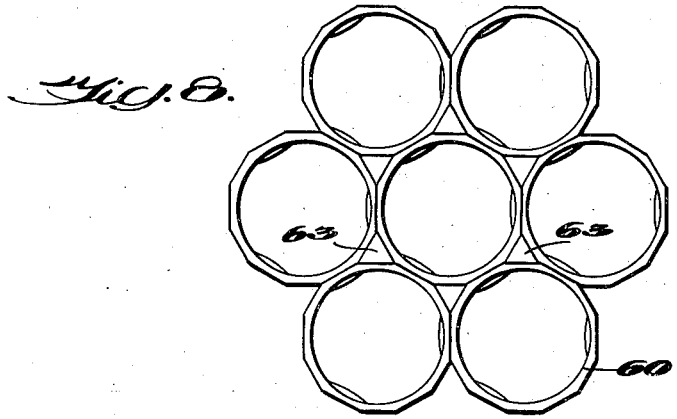
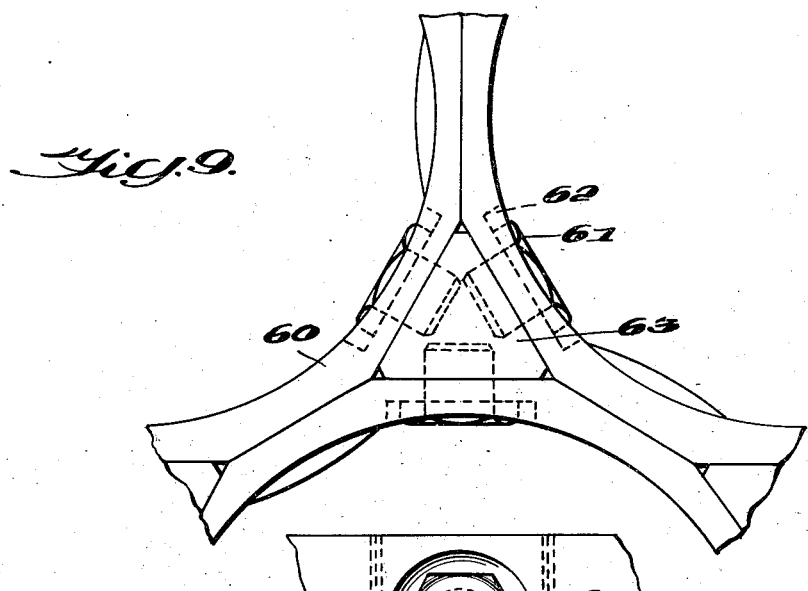
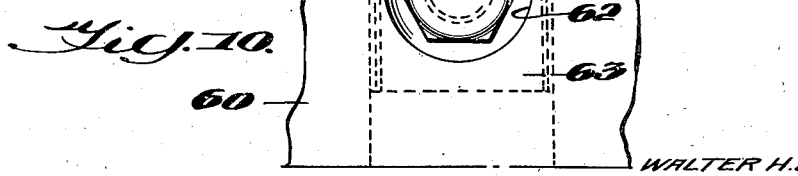
Inventor
WALTER H. D'ARDENNE,
By Robert B. Larson
Attorney Patented Sept. 13, 1949

2,481,910

UNITED STATES PATENT OFFICE 2,481,910

ROCKET LAUNCHER

Walter H. D'Ardenne, Jenkintown Manor, Pa., assignor to Heintz Manufacturing Company, Philadelphia, Pa., a corporation of Pennsylvania Application June 5, 1946, Serial No. 674,593

8 Claims. (Cl. 89—1.7)

This invention relates to rocket launchers and more particularly to multiple tube type launchers.

One object of the invention is to provide a multi-tube rocket launcher assembly comprising a plurality of interchangeable launcher tubes maintained in assembled relationship in a novel manner.

Another object of the invention is to provide a multi-tube rocket launcher assembly for electrically fired rockets having novel means for positioning rockets in the subes and supplying firing current to the rockets.

The invention has for another object the provision of a novel extruded rocket launcher tube.

A further object of the invention is to provide a rocket launcher tube assembly, the components of which are adapted to large scale manufacture, and which may be quickly assembled by relatively unskilled personnel.

These and other objects of the invention will be apparent from the following specification and the accompanying drawings, in which:

Fig. 1 is a side elevational view showing the multi-tube assembly and its relation to its carriage mechanism which is shown in broken lines;

Fig. 2 is a rear elevational view of a portion of the multi-tube assembly;

Fig. 3 is a detail rear elevational view of a portion of the rear end of one of the launching tubes on the bottom row;

Fig. 4 is a detail bottom plan view of the structure shown in Fig. 3 with some the parts omitted for purposes of clarity;

Fig. 5 is a detail longitudinal sectional view taken through the rear end and front end of one of the launcher tubes on line 5—5 of Fig. 2;

Fig. 6 is a detail sectional view of the means for attaching the top and bottom trunnion bushing plates to the tube assembly;

Fig. 7 is a detail sectional view of the means for attaching the utility box and electrical conduits to the tube assembly;

Fig. 8 is a rear elevational view of a modified tube asembly using triangular filler members;

Fig. 9 is a detailed view of a portion of the assembly shown in Fig. 8; and

Fig. 10 is a detail transverse elevational view of a portion of Fig. 9.

While the invention is concerned only with the tube assembly of the launcher, a brief description of the mount for the launcher will be conducive to a better understanding of the advantages of the tube assembly.

The mount comprises generally a cradle frame assembly shown in broken lines at 10 in Fig. 1 and comprising welded tubular top, bottom and side members. The tube assembly denoted generally by the numeral 11 is mounted in the cradle frame by means of vertical traverse trunnion pins (not shown) held in the top and bottom cradle frame members. The traverse trunnion pins engage top and bottom trunnion bushing plates 12 and 13 attached to the launching tube assembly by screws 14 (Fig. 6) which engage nuts mounted within adjacent launcher tubes.

The side members of the cradle frame assembly 10 receive elevating trunnion pins (not shown) which are supported in two upright stanchions 15 welded at their lower ends to a transverse member 16 carrying wheels 17 at each of its ends. Trail members 18 are attached to the upright stanchions 15 and means including a firing pedestal 19 are provided for raising the wheels off the ground to provide a more solid foundation during firing.

The tube assembly includes a plurality of identical launching tubes nested with each tube contiguous along its length with a plurality of other tubes and with bolts or other equivalent fastening means passing through the wall of each tube near its ends into the space between tubes to maintain the tubes in assembled relation. In a preferred embodiment, the assembly includes twenty-four tubes each denoted by the reference numeral 20. The tubes are identical and hence are interchangeable, and are extruded of aluminum alloy with a 12 sided exterior configuration. Interiorly, each tube is formed with three longitudinally extending rounded ridges 21 which serve as rocket guiding rails. The rear ends of the ridges 21 are ground off so that the ridges terminate a short distance short of the rear end of the tubes as may be seen in Fig. 5. Each tube is provided near its rear end with an opening 23 (Fig. 5) for receiving a firing contact which will be described presently. At the front end of each tube 20, countersunk screw holes are provided in two of the three ridges 21 of each tube 20.

The rockets are nested as shown in Fig. 2 with flat sides of each tube in contact with flat sides of adjacent tubes. When so mounted, open spaces are left between tubes and diamond shaped central fillers 26 slightly smaller than the openings in which they are placed, and provided with cutouts 27, are mounted in the spaces between tubes at the rear end of the assembly and are fastened to the tubes by hexagonal head screws 28 (Fig. 5) which pass through the walls of the tubes from the inside thereof and engage threaded openings in the fillers. At the bottoms and sides of the tube assembly, suitable V-shaped fillers 29 and 30 are fastened to the tubes by screws 28.

Each launching tube 20 carries a rocket stop and ground contact 32 which extends a short distance into the rear end of the tube and terminates at its forward end in a broadened portion 33 through which passes an Allen head type screw 34 which engages a nut 35. A cut away central bottom portion 36 provides space for the screw head 28. The rear end of each stop 32 extends radially outwardly beyond the periphery of the launcher tube and has a transverse hole 37 through which passes a screw 38 to mount a resilient contact member 39 on the underside of the stop member. Insulator 40 formed for example of a plastic is positioned between flexible contact 39 and stop member 32, and an insulating bushing 41 surrounds screw 38 at the point where it passes through contact 39. A plain washer 42 and a lock washer 43 are placed between nut 44 and bushing 41.

Contact 39 extends forwardly through cut-out 27 in filler 26 and terminates in an inwardly bent knife edge portion 44 which is adapted to engage a contact ring 45 on rocket 46. The knife edge is slanted rearwardly so that it will be forced downwardly by the rear end of the rocket as the rocket is loaded rearwardly into firing position through the front or muzzle end of the tube. The resiliency of the flexible contact assures a good electrical connection with the contact ring 45 of the rocket.

The rear end of the flexible contact 39 has a threaded opening to receive a screw 47 which passes through a cup washer 48 so as to be adapted to clamp a wire between the screw head and the cup washer.

At the front or muzzle ends of the tubes 20, bolts 28a serve for mounting diamond shaped central fillers 26a similar to fillers 26 in the openings between the tubes. V-shaped outer fillers similar to members 29 and 30 hold the outer tubes together. Two of these outer fillers are seen at 30a in Fig. 1.

The central fillers at the muzzle end each have a diamond shaped steel plate 50 welded to the filler so as to overlap the outer edges of the tubes and completely cover the opening between the tubes. As each tube 21 has countersunk screw holes in the front portions of the two ridges 21 of each tube which are adjacent the connection of the tube to an exterior or interior filler, there is no interference between the bolts 28a extending through these ridges and the rockets 46.

A utility box 55 having a hinged cover 56 and latches 57 is mounted on the upper rear end of the tube assembly and is attached forwardly to upper trunnion plate 12 by forwardly extending arms 58. At the rear, the utility box is fixed to the tube cluster by screws 60 (Fig. 7) extending from the inside of the box through openings near the rear ends of the tubes positioned next inwardly from the outside tubes of the upper row. Nuts 61 located inside the tubes receive the screws and filler washers 62 are positioned between the bottom of the box and the upper surfaces of the two tubes (see Figs. 2 and 7). The cover of the box 55 is hinged at the forward end so as to be closed automatically by rocket blast. The box provides a convenient storage receptacle for sights, firing cable, firing devices, repair tools, cleaning equipment, and the like when such are not in use.

The box 55 also serves as a central meeting point for all of the wires which carry firing current to the individual tubes 20. These wires are carried downwardly from the box through tubular conduits 65 which are securely fixed to the rear end of the bottom of the box by suitable nuts 66 as shown in Fig. 7. The conduits 65 extend downwardly between adjacent vertical rows of launcher tubes at points slightly to the rear of the rear ends of the tubes. At their lower ends each conduit 65 carries a bracket arm 68 fixed to the conduit at one end and attached at its other end to block 32 by screw 38 which also serves for mounting contact 39 on the underside of the block.

Openings 69 are provided in the side walls of conduits 65 adjacent screws 47, and electrical wires 70 are passed through the conduits and out of openings 69 for connection to the rear ends of contacts 39 by means of screws 47. The upper ends of the wires are brought together within box 55 for connection to a suitable firing mechanism (not shown) by a firing cable (also not shown).

In operation, after the launcher tube cluster has been aimed and fixed in the desired position, rockets 46 are loaded base first into the muzzles of the tubes. The rockets are of the spin stabilized type in which a rocket propellant charge is ignited by an electrically operable squib connected to the body of the rocket for ground connection and to contact ring 45 located near the base of the rocket and insulated therefrom. In firing position the rocket rests against stop 32 so that contact ring 45 makes contact with resiliently supported knife edge contact 44. The body of the rocket is grounded by its contact with stop 32 and with the launching tube.

To fire the rockets a firing switch (not shown) is closed connecting a source of current (not shown) such as a battery or a hand operated generator to contact 39 of the rocket tube to be fired. An intervalometer (not shown) may be included in the circuit to fire the rockets in a predetermined order. Such firing circuits are conventional and it is believed unnecessary to describe them in greater detail.

The assembled tube unit has the advantages of compactness and rigidity, and is well adapted for mass production because of the interchangeability of the tubes, fillers, contacts and other parts. The assembly is so simple to put together that relatively unskilled persons are able to carry out the assembly.

The novel extruded construction of the tubes permits rapid fabrication of the tubes in considerable quantity and simplifies the provision of the internal rails 21. In previous launcher tubes it was necessary to weld separate rail members to the interiors of the tubes, thereby adding a time consuming step to the production procedure. In the present construction, the advantages of the integral rails over welded rails are obvious.

A modified type of assembly is shown in Figs. 8–10 wherein twelve sided tubes 60 are assembled in straight horizontal rows and in staggered vertical rows. The tubes 60 are similar to tubes 20 except for a slightly different positioning of the holes for the bolts which hold the assembly together. In Figs. 8 and 9, bolts 61 have their heads located in countersunk portions 62 of the tubes located near each end of each tube. Bolts 61 thread into triangularly shaped front and rear fillers 63 located in the triangular interior opening between adjacent tubes. The fillers 63 are slightly smaller than the openings in which they are located so that the tubes will bear tightly against each other along their contacting portions. Suitable external fillers (not shown) may be provided if desired.

This modified assembly has the advantages of the preferred embodiment and may be desirable where a different exterior cluster configuration is desirable.

It is to be understood that the invention is not to be limited to the constructions shown and described herein but is intended to include all embodiments of the invention coming with in the scope of the appended claims.

I claim:

1. A rocket launcher tube assembly comprising a cluster of launching tubes each having a plurality of flat outer sides, certain of the flat sides of adjacent tubes being contiguous along the length of the tubes, said tubes having raised interior rocket guiding surfaces, filler members positioned along adjacent tubes for securing the tubes in clustered relation, and fastening means extending into said tubes for securing said filler members to said tubes, said fastening means extending into said tubes a distance less than the height of said raised guiding surfaces.

2. A rocket launcher tube assembly comprising a plurality of multi-sided substantially identical launching tubes, said tubes being nested together in a cluster in vertical and horizontal rows so that flat sides of adjacent tubes are in contact with each other, filler members positioned in the spaces between tubes at the front and rear of said assembly and fastened to said tubes, each of said tubes having an opening in its wall near its rear end, and electrical contact members extending one through each of said rear filler members and extending through said openings into the interiors of the tubes to act as firing contacts.

3. A rocket launcher tube assembly comprising a plurality of multi-sided substantially identical launching tubes, said tubes being nested together in a cluster in vertical and horizontal rows so that flat sides of adjacent tubes are in contact with each other, filler members positioned in the spaces between tubes at the front and rear of said assembly and fastened to each adjacent tube, each of said tubes having a wall opening near its rear end, rear stop members carried by the rear end of each tube to position rockets disposed within the tubes, and flexible electrical contact members fixed to the rear end of each of said stop members and extending through each of said rear filler members and through said openings into the interiors of the tubes to provide firing contacts.

4. A tube assembly as set forth in claim 3 in which tubular conduits extend downwardly at the rear of said assembly and carry electrical wiring connected to said firing contacts.

5. A tube assembly as set forth in claim 3 in which an enclosure is mounted on the upper rear end of said tube cluster, tubular conduits extending downwardly from the interior of said enclosure at points slightly rearwardly of the rear ends of said tubes and substantially aligned with the lines of contact between adjacent vertical rows of tubes, and electrical wiring passing from the interior of said enclosure downwardly through said conduits and connected to said electrical contact members.

6. A tube assembly as set forth in claim 3 in which an enclosure is mounted on the upper rear end of said tube cluster, tubular conduits extending downwardly from the interior of said enclosure, said conduits being positioned slightly rearwardly of the rear ends of said tubes and substantially in alignment with the lines of contact between adjacent vertical rows of tubes, electrical wiring passing from the interior of said enclosure downwardly through said conduits and connected to said electrical contact members, and bracket members carried by each of said conduits and anchored to the rear stop member on an adjacent launching tube.

7. In a rocket launcher of the tubular type, the combination of a fixed rear stop member extending into the rear end of the tube and carried by the tube, and a resilient contact member carried by and insulated from said stop and extending through the side wall of the tube from the outside.

8. A rocket launcher tube assembly comprising a cluster of identical tubes, each tube being contiguous along its length with a plurality of other tubes, and fastening means passing through the wall of each tube near its ends for securing each tube in assembled relation with adjacent tubes, said tubes having raised interior rocket guiding surfaces, and said fastening means extending into said tubes a distance less than the height of said surfaces.

WALTER H. D'ARDENNE.

REFERENCES CITED

The following references are of record in the file of this patent:

UNITED STATES PATENTS

| Number | Name | Date |
| --- | --- | --- |
| 328,713 | Petty | Oct. 20, 1885 |
| 1,108,716 | Davis | Aug. 25, 1914 |
| 2,380,025 | Chandler | July 10, 1945 |
| 2,421,522 | Pope | June 3, 1947 |
| 2,448,962 | D'Ardenne | Sept. 7, 1948 |

FOREIGN PATENTS

| Number | Country | Date |
| --- | --- | --- |
| 762 | Great Britain | 1860 |
| 329,235 | France | May 23, 1903 |
| 832,464 | France | July 4, 1938 |

OTHER REFERENCES

"Life" magazine, January 29, 1945, page 72.